(12) United States Patent
Valberg (10) Patent No.: US 10,613,542 B2
(45) Date of Patent: Apr. 7, 2020

(54) METHODS OF CONTROLLING AN AGRICULTURAL IMPLEMENT, AND AN AGRICULTURAL IMPLEMENT

(71) Applicant: Vaderstad Holding AB, Vaderstad (SE)

(72) Inventor: Stefan Valberg, Linkoping (SE)

(73) Assignee: Vaderstad Holding AB, Vaderstad (SE)

( * ) Notice: Subject to any disclaimer, the term of this patent is extended or adjusted under 35 U.S.C. 154(b) by 182 days.

(21) Appl. No.: 15/754,390

(22) PCT Filed: Aug. 25, 2016

(86) PCT No.: PCT/SE2016/050803
§ 371 (c)(1),
(2) Date: Feb. 22, 2018

(87) PCT Pub. No.: WO2017/034469
PCT Pub. Date: Mar. 2, 2017

(65) Prior Publication Data
US 2018/0239360 A1    Aug. 23, 2018

(30) Foreign Application Priority Data
Aug. 26, 2015 (SE) ...................................... 1551101

(51) Int. Cl.
*G05D 1/02* (2020.01)
*A01B 73/00* (2006.01)
(Continued)

(52) U.S. Cl.
CPC ........... *G05D 1/0223* (2013.01); *A01B 73/00* (2013.01); *A01B 73/02* (2013.01); *G05D 1/005* (2013.01); *G05D 1/0022* (2013.01); *G06F 3/0488* (2013.01); *A01D 75/20* (2013.01); *A01D 2075/203* (2013.01); *G05D 2201/0201* (2013.01)

(58) Field of Classification Search
CPC .... G05D 1/0223; G05D 1/0022; G05D 1/005; G05D 2201/0201; A01B 73/00; A01B 73/02; G06F 3/0488; A01D 75/20; A01D 2075/203
See application file for complete search history.

(56) References Cited

U.S. PATENT DOCUMENTS

| 4,878,338 A | 11/1989 | Aldred |
| 5,343,675 A | 9/1994 | Norton |

(Continued)

FOREIGN PATENT DOCUMENTS

EP    2846209 A2    3/2015

*Primary Examiner* — Sze-Hon Kong
(74) *Attorney, Agent, or Firm* — Coats & Bennett PLLC (57) ABSTRACT

This document relates to an agricultural implement with hydraulic functions and a method of controlling an agricultural implement comprising receiving a speed signal which represents the advancing speed of the agricultural implement, receiving a control signal from a first user interface, allowing, if the speed fulfils a predetermined criterion, the activation of a first actuator function and of a second actuator function based on a control signal, and, if the speed does not fulfil the criterion, restricting the possibility of activating the first actuator function based on a control signal.

20 Claims, 2 Drawing Sheets

(51) Int. Cl.
*A01B 73/02* (2006.01)
*G05D 1/00* (2006.01)
*G06F 3/0488* (2013.01)
*A01D 75/20* (2006.01)

(56) References Cited

U.S. PATENT DOCUMENTS

| | | | |
|---|---|---|---|
| 6,336,051 B1 * | 1/2002 | Pangels | A01B 79/005 700/207 |
| 2004/0194353 A1 * | 10/2004 | Hoerle | E01H 5/04 37/219 |
| 2007/0015626 A1 | 1/2007 | Strosser | |
| 2007/0298685 A1 * | 12/2007 | Cloutier | B23Q 17/2233 451/5 |
| 2008/0034720 A1 * | 2/2008 | Helfrich | A01D 41/127 56/10.2 R |
| 2009/0224084 A1 | 9/2009 | Hoisington | |
| 2010/0287900 A1 * | 11/2010 | Ringwald | A01D 41/141 56/17.1 |
| 2011/0153169 A1 * | 6/2011 | Peterson | A01M 7/0075 701/50 |
| 2012/0089293 A1 * | 4/2012 | Halder | B60W 50/0205 701/24 |
| 2013/0264139 A1 * | 10/2013 | Braun | E02F 9/16 180/322 |
| 2014/0003888 A1 | 1/2014 | Dux et al. | |
| 2014/0176303 A1 * | 6/2014 | Stratton | G08C 17/02 340/5.61 |
| 2015/0361640 A1 * | 12/2015 | Faivre | E02F 3/844 701/50 |
| 2016/0170415 A1 * | 6/2016 | Zahr | G05D 1/0293 701/23 |

* cited by examiner

METHODS OF CONTROLLING AN AGRICULTURAL IMPLEMENT, AND AN AGRICULTURAL IMPLEMENT

TECHNICAL DOMAIN

This document relates to methods of controlling an agricultural implement and its actuator functions, such as hydraulic functions, and an agricultural implement.

BACKGROUND

Many agricultural implements utilise hydraulics as a source of power for activating various functions, such as retracting and extending frame sections, marker arms or transporters, adjusting working depths or sowing depths and/or supplying air and/or material.

The components which are moved or adjusted using hydraulics are often large and heavy. Proportionally large forces are therefore involved.

As agricultural implements are becoming ever more complex, with a larger number of frame sections seen both in the longitudinal and lateral direction of the agricultural implement, and often with a large number of tools controlled individually or in groups, great demands are made on the control of the hydraulics.

At the same time as the agricultural implements are becoming more complex the requirements for user-friendliness remain or are growing. It is desirable to reduce the amount of training and experience needed by an operator to be able to handle an agricultural implement.

In line with the above-described developments, intelligent, processor-based control systems are becoming more common, in particular such control systems which are based on generally available hardware and software platforms.

In addition to the aforementioned requirements and wishes, there is also a call for the operator's working environment to be such that the risk of harm is minimised.

U.S. Pat. No. 5,343,675 sets out a safety module which stops the operation of moving equipment parts in a machine if a movement sensor detects that the speed of the machine is lower than a preselected speed. This is to prevent the moving parts causing injury to the operator or other persons who may get in the way of the moving parts when the machine speed is too low or when it is standing still. The moving parts can be, for example, a conveyor belt or maize cutter on a tractor-drawn maize picker or the rotating blade of a grass cutter.

It is desirable to provide an agricultural implement which is both larger and more complex and which is simpler to operate, but without comprising when it comes to the safety of the operator or other persons in its vicinity.

SUMMARY

One aim is therefore to provide a method of controlling an agricultural implement's actuator functions and to provide an agricultural implement whose actuator functions are simple to control under conditions that are safe for the operator and others.

The invention is defined by the attached independent claims. Forms of embodiment are evident from the attached dependent claims, the following description and the drawings.

According to a first aspect a method of controlling an agricultural implement is provided which comprises receiving a speed signal, which represents the advancing speed of the agricultural implement, receiving a control signal from a first user interface, and if the speed signal fulfils a predetermined criterion, allowing the activation of a first actuator function and of a second actuator function based on the control signal, and if the speed signal does not fulfil the criterion, restricting the possibility of activating the first actuator function based on the control signal.

The speed signal can be received in a control unit which can determine whether said activations should be permitted or restricted.

The control unit can comprise one or more units which can interact with each other and which can be placed on the agricultural implement and/or on a traction vehicle to which the agricultural implement is connected.

The term "speed signal" is taken to mean a signal which can be analogue or digital and which represents the speed at which the agricultural implement is advancing. For example, the speed signal can be one or more values which represent the current speed or two or more position values which together with time data can be used to derive the advancing speed. Another example of the speed signal can be an accelerometer which measures shaking/vibrations where frequency and amplitude can be correlated to the advancing speed.

The term "actuator function" relates to a function which is carried out, controlled or initiated with the aid of an actuator, i.e. a movement-converting entity. Such actuators can be hydraulic, pneumatic or electrical. Non-restrictive examples can be the extension and retraction of frame sections, tools, markers arms, transporters or other parts of the agricultural implement; the operation of measuring devices for air, liquid and/or granulate; and adjusting devices for the working depth or sowing depth for example.

The term "speed criterion" is taken to mean a criterion which is based on the agricultural implement's advancing speed. For example, the advancing speed can be selected from a group comprising "agricultural implement in motion", "minimum speed", "maximum speed" or a combination thereof, such as "speed within a predetermined range". For example, a minimum speed can be 1 km/h, 1.5 km/h, 2 km/h or 2.5 km/h. A maximum speed can be 20 km/h, 15 km/h, 10 km/h or 5 km/h.

The term "based on" is taken to mean, as a non-restrictive example, that activation is provided as a response to, or as a function of, the control signal. Activation can be provided in the form of a signal which is derived from the control signal, for example, through calculation or reference to tables. Activation can also be provided immediately the control signal is received or after a delay, possibly in connection with the control signal being temporarily or permanently saved. Activation can be in the form or one or more signals, for example in the form of a sequence of signals emitted directly one after the other or at predetermined intervals, for example in the form of time slots or when awaiting feedback from one or more sensors.

The term "user interface" is primarily taken to mean a device for inputting control indications. A user interface can thus be a physical item and comprise controls for controlling hydraulic or electrical systems, buttons, knobs or similar. Alternatively the user interface can be virtual and in the form of a touchscreen for example.

"Restricting the possibility" is taken to mean hindering activation or setting further requirements before activation is permitted.

With a method as set out above, it is possible to reduce the risk of a function being activated at too low speeds and/or at too high speeds.

It is evident that such restrictions of activation can take place on one or more groups of actuator functions and that different groups can be restricted based on different speed criteria.

Through the method, activation of an actuator function can be prevented when the agricultural implement is in such a state of motion that it could be imagined that an operator or other persons working with the agricultural implement could be injured if the actuator function is activated.

For example certain extension and retraction operations may only be permitted when the agricultural implement is moving at such a speed that the operator must be in the control cab.

The method also includes that if the speed signal does not fulfil the criterion, activation of the first actuator function based on the control signal is permitted only if there is an input from another user interface. This other user interface can be fixed at a secure place on the traction vehicle or on the agricultural implement.

Alternatively the method can also include the situation that if the speed signal does not fulfil the criterion, activation of the first actuator function based on the control signal is prevented.

For example, the activation of certain actuator functions can be restricted and others prevented.

As a further alternative, or in addition, the method can also comprise determining a position of the first user interface, and if the speed signal does not fulfil the criterion, allowing the activation of the first actuator function based on the control signal only if the first user interface is in a secure area.

The term "secure area" refers to an area located outside a risk zone associated with the first actuator function, i.e. typically an area where there is no or only an extremely small risk of being injured as a consequence of the operation of the actuator function.

Through this method it is also possible to avoid a control command being given from a user interface which is not located in a secure area. In connection with this an operator using a portable user interface such as a tablet computer can be prevented from activating an actuator function when he is in a place where he is at risk of being injured thereby.

It is clear that different risk zones can be linked to different actuator functions and that there can be different safe locations depending on which actuator function is concerned.

For example, the first user interface can be firmly mounted on a part of the agricultural implement which can be considered as a safe area, or in the traction vehicle, and the second user interface can be portable, such as a tablet computer.

The position of the user interface can be determined in any way, for example through GPS, range measurement based on signal strength or field of vision or connection by cable or docking station.

The above methods can also comprise receiving a second speed signal, which represents the advancing speed, allowing the activation of a first actuator function and of a second actuator function on the agricultural implement if the second speed signal fulfils the predetermined speed criterion and, restricting the possibility of activating the first actuator function based on the control signal if the second speed signal does not fulfil the speed criterion.

By using two speed signals the risk of either of them providing an incorrect signal is reduced.

The first speed signal can be received from a first speed sensor and the second speed signal can be received from a second speed sensor which operates independently of the first speed sensor, wherein the first and second speed sensors preferably measure the advancing speed in accordance with different measuring methods.

One measuring method can be, for example, GPS, ground-penetrating radar, ground-penetrating ultrasound, ground wheels and suchlike. It is evident that one of the sensors can be a speed measuring device which is associated with a traction vehicle to which the agricultural implement is connected.

The first speed signal can be received by a first processing unit and the second speed signal can be received by a second processing unit which operated independently of the first processing unit.

By using different processing units which, without interacting with each other, receive and process speed signals, the risk of an error occurring during processing is reduced.

The processing units can differ from each other with regard to at least processor type and manufacturer.

Through using non-identical processing units the risk of systemic defects or manufacturing faults affecting the processing is reduced.

The method also comprises ensuring the first actuator function via a main regulator, wherein said activation is permitted in that the main regular is opened.

The method also comprises bypassing the main regulator by way of the second user interface.

The second user interface can, for example, be a hydraulic control lever on a tractor which is connected in order to bypass the main regulator so that the first actuator function is supplied with hydraulic fluid in spite of the fact that the main regulator (which can be a main valve) is blocked by the control unit.

At least one of the actuator functions can be supplied via a main regulator which can be activated by way of an electrical potential difference produced via a pair of supply lines, wherein the potential on the first of the supply lines can be provided by the first processing unit, and wherein the potential on the second of the supply lines can be provided by the second processing unit.

By allowing the respective processing unit (possibly with required amplifiers or similar) to supply its own part of the electrical potential which operates the main valve, the risk of unintentional activation is reduced.

The first actuator function can be included in a first group of actuator functions which are individually controllable and supplied via a first joint main regulator.

The second actuator function can be included in a second group of actuator functions which are individually controllable and supplied via a second joint main regulator.

The first and second actuator functions can have different classifications in terms of safety.

Safety-critical actuator functions can be those which are classed as posing a relatively high risk for persons located in a danger zone in the proximity of or under the agricultural implement. Examples of such safety-critical actuator functions can be the extension and retraction of machine sections, wing or arms of agricultural implements and where these actuator function movements can be of sufficient speed and/or sufficient force to cause crushing, cutting or squeezing injuries.

Non-safety-critical actuator functions of the agricultural implement can be such functions whose unintentional activation is classed as posing a relatively low risk for persons located in a zone in the proximity of or under the agricultural implement.

One example of such a non-safety-critical actuator function is, for example, a protectively mounted (encapsulated) fan or a protectively attached dispensing device inside a sowing machine. Typically such functions do not take place at sufficient speed or force to cause serious injuries, or, alternatively, they are fitted in such a way that during normal use they are inaccessible to the user.

For example the first actuator function can be safety-critical actuator function and the second actuator function can be a non-safety-critical actuator function.

According to a second aspect a method of controlling an agricultural implement is provided which comprises receiving a control signal from a first user interface, determining a position of the first user interface and if the position is in a safe area allowing the activation of a first actuator function and of a second actuator function based on the control signal, and if the position is not in a safe area restricting the possibility of activating the first actuator function based on the control signal.

The method can also include that if the position is in a safe area, activation of the first actuator function based on the control signal is permitted only if there is an input from another user interface.

Additionally or alternatively the method can also include the situation that if the position is not in a safe area, activation of the first actuator function based on the control signal is prevented.

The above method can be implemented in a control unit which can comprise one or more processing units and can be arranged on the agricultural implement and/or in a traction vehicle.

The first actuator function can be selected from a group comprising a hydraulic function, a pneumatic function and an electrical function and the second actuator function can be selected from a group comprising a hydraulic function, a pneumatic function and an electrical function.

According to a third aspect an agricultural implement is provided comprising a first actuator function, a second actuator function, a first user interface, a first speed sensor which is configured to detect the agricultural implement's advancing speed and a control unit which is configured to receive a speed signal from the first speed sensor and which is configured to control the first and second actuator functions based on a control signal from the user interface. The control unit is configured so that if the speed signal fulfils a predetermined criterion, it permits activation of the first actuator function and the second actuator function based on the control signal, and if the speed signal does not fulfil the criterion it restricts the possibility of activating the first actuator function based on the control signal.

The agricultural implement also comprises a second user interface, wherein the control unit is configured to permit activation of the first actuator function based on the control signal only if a input from the second user interface is provided.

The control unit can also be configured so that if the speed signal does not fulfil the criterion, activation of the first actuator function based on the control signal is prevented.

The agricultural implement can also comprise a sensor for detecting a position of the first user interface and the control unit can be configured so that if the speed signal does not fulfil the criterion, activation of the first actuator function based on the control signal is only permitted if the first user interface is located in a safe area.

The agricultural implement can also comprise a second speed sensor configured to produce a second speed signal which represents the agricultural implement's advancing speed, wherein the control unit can be configured to allow the activation of a first actuator function and of a second actuator function on the agricultural implement and of if the second speed signal fulfils the predetermined speed criterion and wherein the control unit can be configured to restrict the possibility of activating the first actuator function based on the control signal if the speed signal does not fulfil the speed criterion.

The first and second speed sensors can be arranged to operate independently of each other, wherein they can preferably be configured to measure the advancing speed in accordance with different measuring methods.

A measuring method can be, for example, GPS, ground-penetrating radar, ground-penetrating ultrasound, ground wheels.

The agricultural implement can also comprise a first processing unit which can be effectively connected to the first speed sensor, a second processing unit which can be effectively connected to the second speed sensor, wherein the processing units can operate independently of each other.

The processing units can differ from each other with regard to at least processor type and manufacturer.

The agricultural implement can also comprise a main regulator (for example a valve), via which any one of the first or the second actuator functions can be supplied with power, a pair of supply lines which can be connected to the main regulator and configured to provide an electrical potential difference for operating the main regulator, wherein the first processing unit can be connected to one of the supply lines to provide a first potential and wherein the second processing unit can be connected to the other one of the supply lines to provide a first potential.

Preferably it is the first actuator function which is supplied via the main valve.

Said first and second potentials can be such that they differ from each other through the potential difference.

The agricultural implement can comprise a first group of actuator functions, in which the first actuator function can be included, said actuator functions being individually controllable and supplied via a first common main regulator.

The agricultural implement can comprise a second group of actuator functions, in which the second actuator function can be included, said actuator functions being individually controllable and supplied via a second common main regulator.

The first and second actuator functions can have different classifications with regard to safety.

According to a fourth aspect an agricultural implement is provided comprising a first actuator function, a second actuator function, a first user interface, a control unit which is configured to receive an activation signal from the user interface and is configured to control the first and second actuator functions, and a position sensor for determining the position of the first user interface. The control unit is configured so that if the position is in a safe area it allows the activation of a first actuator function and of a second actuator function based on the control signal, and if the position is not in a safe area it restricts the possibility of activating the first actuator function based on the control signal.

The control unit is configured so that if the position is not in a safe area, activation of the first actuator function based on the control signal is permitted only if there is an input from a second user interface.

Additionally or alternatively the control unit can be configured so that if the position is not in a safe area, activation of the first actuator function based on the control signal is prevented.

The first actuator function can be selected from a group comprising a hydraulic function, a pneumatic function and an electrical function and the second actuator function can be selected from a group comprising a hydraulic function, a pneumatic function and an electrical function.

The agricultural implement can be a soil-working agricultural implement, such as a cultivator, a harrow, a plough, a sowing machine or a machine for distributing granulate or fluid material to the ground over which the agricultural implement is travelling.

DETAILED DESCRIPTION

Figure 1:
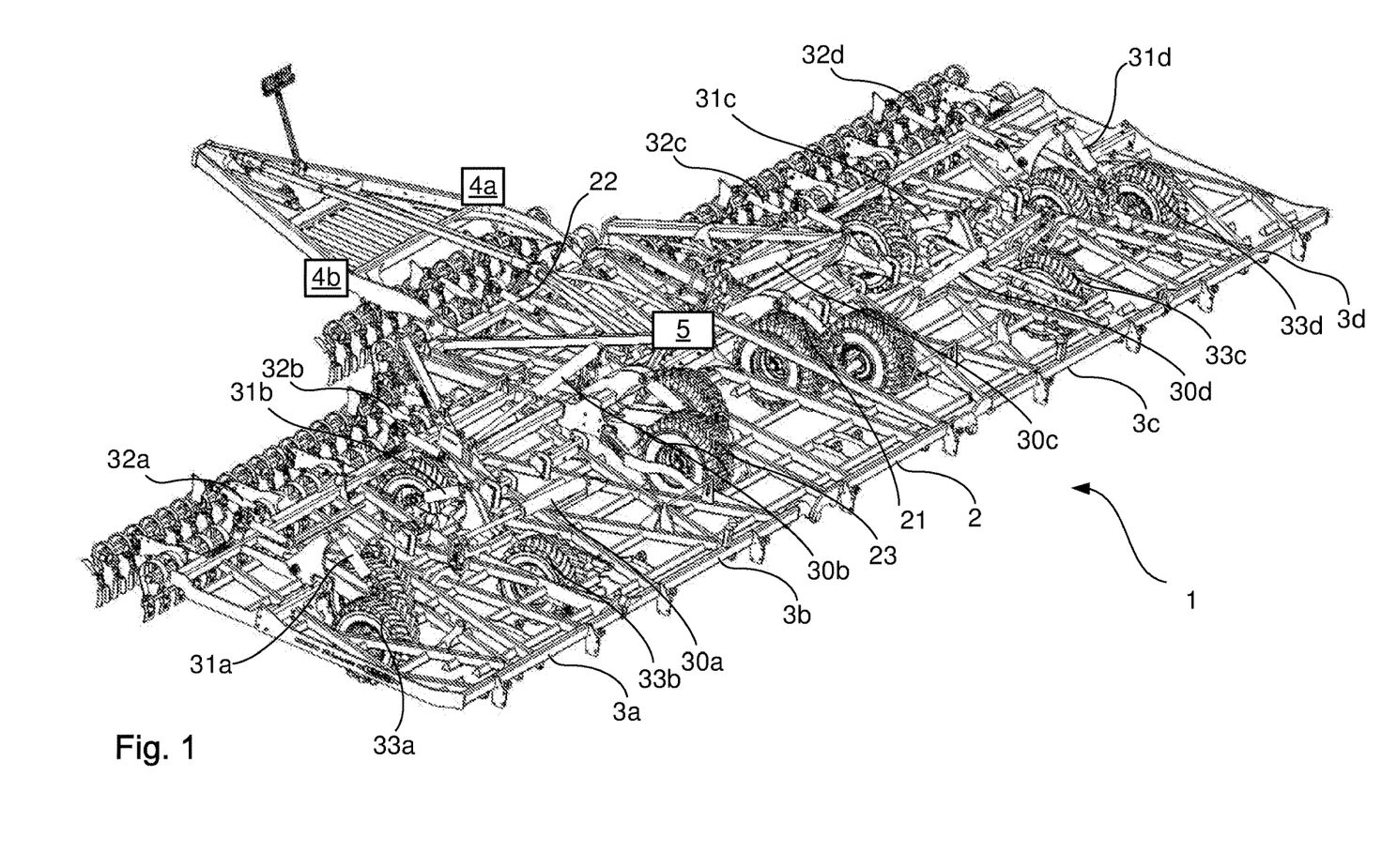
FIG. 1 shows a perspective view of an agricultural implement with hydraulic functions.

FIG. 1 shows a perspective view of an agricultural implement in the form of a cultivator seen from above and diagonally from the rear. The agricultural implement 1 comprises a main frame 2, which via a drawbar can be connected to a traction vehicle (shown in FIG. 2), such as a tractor T.

The agricultural implement in FIG. 1 has four side sections 3a, 3b, 3c, 3a which are movable relative to the main frame 2 and can retracted and extended by means of hydraulic actuators 30a, 30b, 30c, 30d in order to reduce the transporting width of the agricultural implement 1, when travelling on public roads for example. The hydraulic actuators 30a, 30b, 30c, 30d can also be used to adjust the angle of the frame sections 2, 3a, 3b, 3c, 3d relative to each other and to raise one or more frame sections in order to facilitate turning.

The agricultural implement 1 can also comprise actuators 21, 31a, 31b, 31c, 31d for adjusting the working depth through acting on wheels 23, 33a, 33b, 33c, 33d in contact with the ground.

The agricultural implement can also comprise actuators 22, 32a, 32b, 32c, 32d for adjusting individual tools or frame sections holding a group of tools.

Hydraulics can also be used as a power source for activating other functions on the cultivator and to realise various functions on other types of soil-working agricultural implements, such as, for example, cultivators, ploughs, sowing machines or machines for dispensing solid or fluid material to the ground over which the agricultural implement is travelling. Examples of such hydraulic functions are retracting and extending frame sections, marker arms or transporters, adjusting working depths or sowing depths and/or supplying air and/or material.

The components which are moved or adjusted using hydraulics are thus large and heavy so that proportionally large forces are required.

Other functions, such as encapsulated fans and protectively mounted dispensing devices can also be driven hydraulically, but these often have a different safety classification as the operator is not at risk of coming into contact with them during normal operation.

Figure 2:
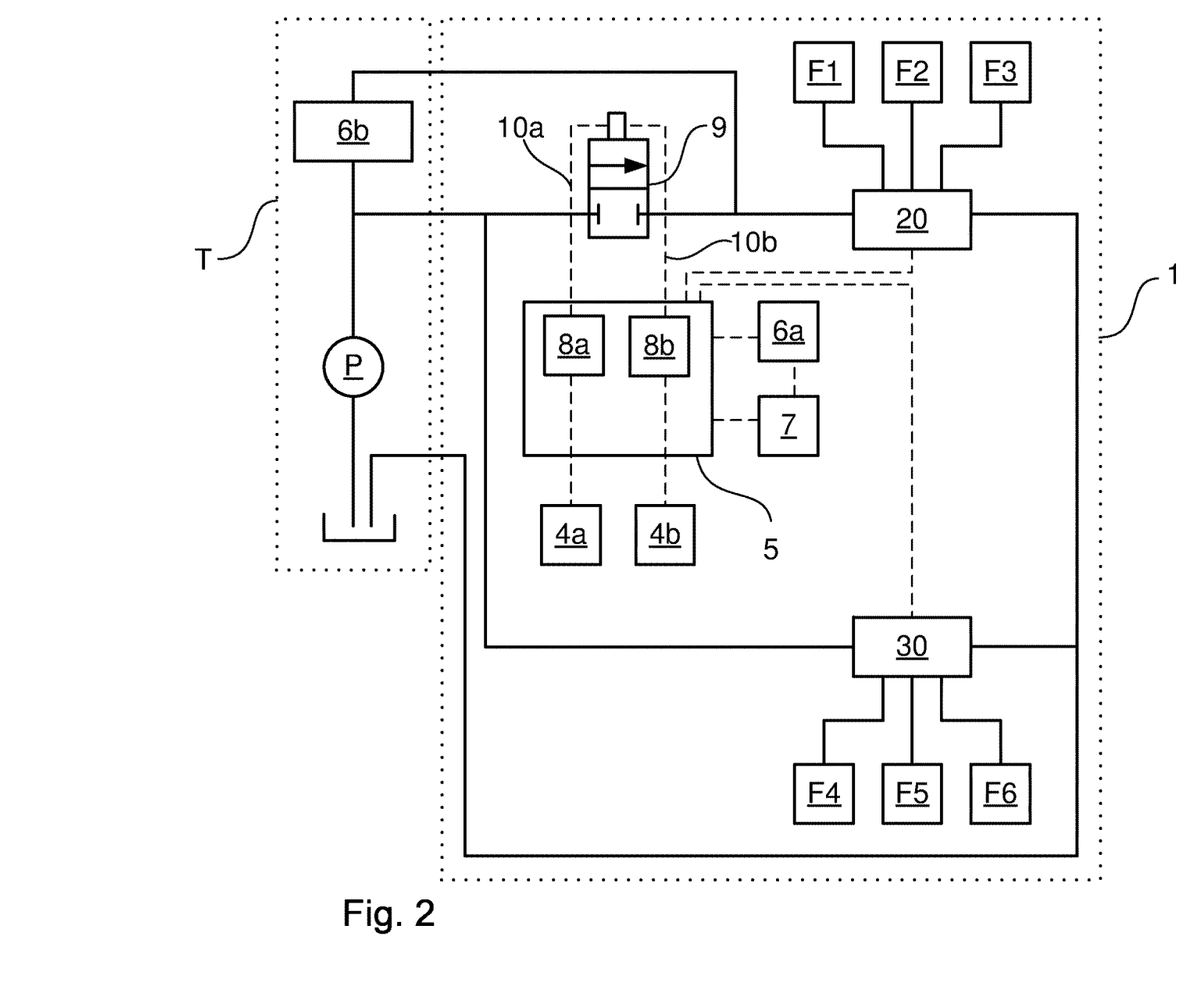
FIG. 2 shows a block diagram of the control of an agricultural implement's hydraulic functions.

FIG. 2 shows a schematic block diagram of a control system for first and second hydraulic functions F1, F2, F3; F4, F5, F6 of an agricultural implement 1.

FIG. 2 schematically shows a traction vehicle T which can be a tractor comprising a hydraulic system which has a pump P which obtains hydraulic fluid from a reservoir and provides pressure and a hydraulic flow to the agricultural implement 1. This system can, but does not have to be, a so-called LS system, a load-sensing hydraulic system.

In addition, in the illustrated example, a user interface 6b is arranged on the traction vehicle T. This user interface can be in the form of one or more hydraulic controls for regulating the output from the pump P.

The agricultural implement 1 can have one or more speed sensors 4a, 4b for detecting the advancing speed of the agricultural implement 1. Alternatively, a speed sensor 4a, 4b (or all the speed sensors) can be associated with a traction vehicle to which the agricultural implement 1 is connected, instead of being associated with the agricultural implement 1 itself.

A control unit 5 is mounted on the agricultural implement 1 and/or the traction vehicle T, to which the agricultural implement 1 is connected in order to receive a speed signal/speed signals from the speed sensor(s) 4a, 4b. The control unit 5 can comprise one or more units which can interact with each other.

Based on the received speed signal, the control unit 5 controls the first and second hydraulic functions F1, F2, F3; F4, F5, F6 which can comprise any of the hydraulic functions 30a, 30b, 30c, 30d; 31a, 31b, 31c, 31d; 22, 32a, 32b, 32c, 32d described above.

The control unit 5 is configured to allow activation of both the first and the second hydraulic function F1, F2, F3; F4, F5, F6 if the speed signal fulfils a predetermined speed criterion. If there are two speed sensors 4a, 4b, the control unit can be configured so that both speed signals have to fulfil the speed criterion for activation of both the first and second hydraulic function F1, F2, F3; F4, F5, F6 to be allowed.

The first hydraulic function F1, F2, F3 can comprise such hydraulic functions whose activation can be associated with a risk of injury to the operator or other persons if they should find themselves with the operating area of the hydraulic functions in question.

The second hydraulic function F4, F5, F6 can comprise such hydraulic functions whose activation, at least under normal operating conditions, pose little or no risk of harm to the operator.

The hydraulic functions can be supplied and controlled via respective hydraulic blocks 20, 30 which comprise valves for controlling the relevant hydraulic functions F1, F2, F3; F4, F5, F6. The hydraulic block 20, 30 is connected to the control unit 5 so that signals from the control unit open or close the valves.

It is evident that any number of hydraulic blocks 20, 30 can be provided. It is possible to provide one or more hydraulic blocks on each hydraulic line from the tractor T and to control these on the basis of the same, or entirely different criteria (speed, safe area).

If the speed signal, or, in the case of two speed sensors, at least one of the speed signals does not fulfil the predetermined speed criterion, the control unit 5 only allows the activation of the second hydraulic function F4, F5, F6.

One main valve 9 can be associated with each hydraulic block 20, 30 and one such main valve can be integrated with the hydraulic block. It is also clear that each hydraulic line from a tractor T can be provided with an arrangement in accordance with what is shown in FIG. 2.

Alternatively two or more hydraulic blocks can be supplied via one and the same main valve.

The speed sensors 4a, 4b can, for example be based on measuring methods such as GPS, ground-penetrating radar, ground-penetrating ultrasound or ground wheels. The first and second speed sensors 4a, 4b can be arranged to operate independently of each other and are preferably configured to measure the advancing speed of the agricultural implement 1 in accordance with different measuring methods. For example, a first speed sensor 4a can measure using radar and a second speed sensor can measure by way of GPS or similar systems.

A tolerance for deviations between speed signals from the sensors 4a, 4b can be selected.

The speed criterion is based on the advancing speed of the agricultural implement 1 and can be such that the agricultural implement 1 must be in motion, have a minimum speed, have a maximum speed or a combination of these and that the agricultural implement 1 must have a speed that is within a predetermined range. For example, a minimum speed can be 1 km/h, 1.5 km/h, 2 km/h or 2.5 km/h. A maximum speed can be 20 km/h, 15 km/h, 10 km/h or 5 km/h.

With an agricultural implement 1 according to the above, activation of a first hydraulic function F1, F2, F3 can be prevented when the agricultural implement 1 is in such a state of motion that an operator could conceivably be injured when hydraulic function F1, F2, F3, F4, F5, F6 is activated and so in the example in FIG. 1 the extension and retraction of side sections 3a, 3b, 3c, 3d of the cultivator in response to an input via an electronic user interface (such as a tablet computer) can be permitted when the agricultural implement 1 is moving at such a speed that it must be assumed that the operator is in the control cab of the traction vehicle, or when the operator activates a second user interface which is located in the control cab of the traction vehicle.

By using two speed sensors the risk of either of them providing an incorrect signal is reduced.

One or more user interfaces 6a, 6b can be used for inputting control indications for the agricultural implement 1.

A user interface 6b associated with the traction vehicle can be a physical user interface, such as levers for the control of hydraulic or electronic systems, buttons, knobs or similar and can be permanently mounted in the traction vehicle T to which the agricultural implement 1 is connected or firmly mounted on a part of the agricultural implement 1 which is preferably safe. For example, such a user interface can be arranged along the drawbar or in a similar way.

In the illustrated example activation of the second user interface 6b can bypass the main valve 9 so that the first hydraulic functions F1, F2, F3 can be activated even if the main valve is blocking, for example as a result of too low or too high a speed. Activation of the individual valves can take place through the control signals which the control unit, based on input via the first user interface 6a, supplies to the hydraulic block 20.

For example, a hydraulic regulator located in a tractor cab T can be considered as a very safe user interface (corresponding to 6b).

The first user interface 6a can be a virtual, portable user interface, such as, for example, a tablet computer, which can communicate with the control unit 5 via a portal arranged on the agricultural implement and/or in the traction vehicle, in a wireless manner, for example on the basis of Wi-Fi, NFC or Bluetooth®, or through a wired connection via a docking station or a cable.

As it is possible to prevent control commands to the hydraulic functions being issued from a user interface 6a, 6b which is not located in a safe area, an operator using a portable user interface, such as a tablet computer, can be prevented from activating a hydraulic function when he is in a location where he is a risk of being injured thereby.

It must therefore not be possible to be able to control hydraulic functions of the first type, for example the extension and retraction of side sections 3a, 3b, 3c, 3d of the cultivator in FIG. 1 by means of a tablet computer if the tablet computer is not in a safe area. In this way the risk is reduced of an operator being located in an unsafe area where he/she runs the risk of being injured as a result of operation of the hydraulic function.

In order to detect the position of the first user interface 6a the agricultural implement 1a can be provided with a detector 7. The detector can be integrated with an emitter/receiver for wireless communication, and can, for example, deduce the position of the user interface 6a based on GPS, signal strength or field of vision (IR sensor for example). Alternatively the detector can comprise a physical connection to the user interface 6a, such as a cable or docking station.

If the position of the user interface 6a corresponds with the safe area the control unit 5 permits activation of both the first and the second hydraulic function F1, F2, F3; F4, F5, F6. If the position does not correspond with the safe area only activation of the second hydraulic function is permitted.

The agricultural implement 1, for example the control unit 5, can also comprise a first processing unit 8a effectively connected to the first speed sensor 4a, and a second processing unit 8b effectively connected to the second speed sensor 8b. The processing units 8a, 8b can operate independently of each other and receive and process respective speed signals without cooperating with one another. This reduces the risk of an error occurring during processing.

The processing units 8a, 8b can be selected so that they differ from one another in terms of at least the processor type and manufacturer in order to reduce the risk of systemic defects or manufacturing faults in the processing units 8a, 8b affecting the processing.

The agricultural implement 1 can also comprise a main valve 9 via which at least one of the first and the second hydraulic functions F1, F2, F3; F4, F5, F6 is supplied with hydraulic power. A pair of supply lines 10, 10b is connected to the main valve 9 and configured to provide an electrical potential difference there for operating the main valve 9. The first processing unit 8a can be connected to one of the supply lines 10a and the second processing unit 8b can be connected to the other supply line 10b.

The potential difference over the main valve can be 12 V for example, with valve operating signals of 12 V and 0 V from the first and second feed lines 10a, 10b respectively.

By allowing the respective processing unit 8a, 8b to supply its own part of the electrical potential operating the main valve, the risk of unintentional activation is reduced.

Preferably it is the first hydraulic function F1, F2, F3 which is supplied via the main valve 9. The first hydraulic function F1, F2, F3 can be included in a first group of hydraulic functions which can be controlled individually or by group and supplied via a first, joint main valve 9. The first group of hydraulic functions can be "safety critical", i.e. of such a type that unintentional activation risks serious injury to the operator or other persons located in the risk zone.

The agricultural implement 1 can comprise a second group of hydraulic functions, which can include the second hydraulic functions F4, F5, F6 and which are hydraulic functions that can be controlled individually or by group and supplied directly from the pump, possibly via a hydraulic block 30 and controlled with the aid of signals from the control unit 5.

The second hydraulic functions F4, F5, F6 may be able to be supplied via a second joint main valve (not shown) which can function in a similar manner to the first main valve. In the same way as illustrated in relation to the first hydraulic function, such a second, joint main valve (not shown) can be by-passed via the second user interface 6b. The first and second hydraulic functions may be controllable by different control levers in a traction vehicle's control cab.

It is evident that such a second control valve comprising non-safety-critical hydraulic functions can be controlled by a single processing unit and/or be based on a single speed sensor.

The second group of hydraulic functions F4, F5, F6 can thus be controlled directly from the first user interface 6a. Alternatively the second group of hydraulic functions can be controlled with the aid of the first user interface 6a via the control unit 5 or via a part of the control unit.

Alternatively the second group of hydraulic functions can be controlled with the aid of the first user interface 6b via the control unit 5 or via a part of the control unit.

In an alternative form of embodiment of the above agricultural implement 1 it does not comprise any speed sensors, but the control unit 5 is configured to allow activation of first hydraulic function F1, F2, F3 and second hydraulic function F4, F5, F6 only based on whether the user interface or user interfaces 6a/6b is/are located in a safe area. If the user interface/user interfaces 6, 6b is/are not located in a safe area only activation of the first hydraulic function F1, F2, F3 is restricted.

With an agricultural implement in accordance with what has been described above it is possible to assure that potentially dangerous functions, such as the extension and retraction of frame sections can only be carried out when the risk of the operator or other persons working with the agricultural implement, being injured is minimal.

For example, when the agricultural implement is at a standstill the function can only be activated if the operator moves a lever in the tractor cab.

Alternatively, when the agricultural implement is at a standstill, the function can only be activated via a tablet computer if the tablet computer is located in the tractor driver's cab.

At the same time, irrespective of the above, when the agricultural implement is moving sufficiently it is possible to allow activation of the function, and other functions, through inputting, via a tablet computer, for example, wherein pre-programmed sequences of commands can be implemented. When the agricultural implement is travelling forwards at a certain speed the risk of anybody being located in a risk zone is considerably lower.

It is also possible to block other functions when the speed exceeds a predetermined value, as can be the case when the agricultural implement is being transported on public roads.

In the above description a hydraulic function is used as an illustrative example. It is evident that the same can apply to a pneumatic function or an electrical function. In the case of a pneumatic function the main valve 9 is replaced by a pneumatic valve and in the case of an electrical function the main valve can be replaced by a relay.

According to this document there are different ways of reducing the risk of an operator or other person working in the vicinity of an agricultural implement being harmed.

One way of assuring safety is through restricting the possibility of activating potentially dangerous actuator functions when the agricultural implement is at too low (at a standstill for example) or too high a speed.

Another way is to restrict the activation of actuator functions by ensuring that manoeuvring takes place from a safe area, such as via a fixed interface which is located in a safe place or via a mobile interface, wherein manoeuvring is only permitted if the interface is located in a safe area.

Ways of combining the above solutions are also shown.

The invention claimed is:

1. Method of controlling an agricultural implement comprising:
   receiving a speed signal which represents an advancing speed of the agricultural implement,
   receiving a control signal from a first user interface,
   allowing, if the speed signal fulfils a predetermined criterion, the activation of a first actuator function and of a second actuator function based on the control signal,
   restricting, if the speed signal does not fulfil the criterion, the possibility of activating the first actuator function based on the control signal,
   supplying the first actuator function via a main regulator, wherein said activation is permitted in that the main regulator is opened,
   allowing, if the speed signal does not fulfill the criterion, activation of the first actuator function based on the control signal only if there is an input from a second user interface, whereby the main regulator is by-passed by way of the second user interface.

2. Method according to claim 1, further comprising preventing, if the speed signal does not fulfil the criterion, the activation of the first actuator function based on the control signal.

3. Method according to claim 1, further comprising detecting a position of the first user interface and, if the speed signal does not fulfil the criterion, restricting the possibility of activating of the first actuator function based on the control signal only if the first user interface is not in a secure area.

4. Method according to claim 1, further comprising:
   receiving a second speed signal which represents the advancing speed,
   allowing the activation of the first actuator function and of the second actuator function if the second speed signal fulfils the predetermined speed criterion, and
   restricting the possibility of activating the first actuator function based on the control signal if the second speed signal does fulfil the speed criterion.

5. Method according to claim 4 wherein the first speed signal is received from a first speed sensor and wherein the second speed signal is received from a second speed sensor which operates independently of the first speed sensor, wherein the first and second speed sensors preferably measure the advancing speed using different measuring methods.

6. Method according to claim 5 wherein the processing units differ from each other with regard to at least processor type and manufacturer.

7. Method according to claim 5, wherein the main regulator is activated by way of an electrical potential difference produced via a pair of supply lines, wherein the potential on the first of the supply lines is provided by the first processing unit and wherein the potential on the second of the supply lines is provided by the second processing unit (8b).

8. Method according to claim 4 wherein the first speed signal is received by a first processing unit, wherein the second speed signal is received by a second processing unit which operates independently of the first processing unit.

9. Method according to claim 1, wherein the first actuator function is included in a first group of actuator functions which are individually controllable and supplied via a first common main regulator.

10. Method according to claim 1, wherein the second actuator function is included in a second group of actuator functions which are individually controllable and supplied via a second common main regulator.

11. Agricultural implement claim 10, further comprising sensors for detecting a position of the first user interface nd wherein the control unit is set up so that if the speed signal does not fulfil the criterion, it restricts the possibility of activating of the first actuator function based on the control signal only if the first user interface is not in a secure area.

12. Agricultural implement according to claim 10, further comprising,
a second speed-sensor set up to produce a second speed-signal which represents the advancing speed,
wherein the control unit is set up to allow the activation of the first actuator function and of the second actuator function of the agricultural implement if the second speed signal fulfils the predetermined speed criterion, and
wherein the control unit is set up so that if the speed signal does not fulfil the criterion, it restricts the possibility of activating the first actuator function based on the control signal.

13. Method according to claim 1 wherein the first and second actuator functions can have different classifications in terms of safety.

14. Method of controlling an agricultural implement comprising:
receiving a control signal from a first user interface,
determining a position of the first user interface,
allowing, if the position is an safe area, the activation of a first actuator and of a second actuator function based on the control signal,
supplying the first actuator function via a main regulator, wherein said activation is permitted in that the main regulator is opened,
restricting, if the position is not in a safe area, the possibility of activating the first actuator function based on the control signal, and
allowing, if the position is not in the safe area, the activation of the first actuator function based on the control signal only if there is an input from another user interface, whereby the main regulator is by-passed by way of the second user interface.

15. Agricultural implement according to claim 14, wherein the control unit is configured so that if the position is not in a safe area it permits activation of the first actuator function based on the control signal only if there is an input from another user interface.

16. Agricultural implement according to claim 14, wherein the control unit is configured so that if the position is not in a safe area it prevents activation of the first actuator function based on the control signal.

17. Agricultural implement according to claim 14, wherein the first actuator function is selected from a group consisting of a hydraulic function, a pneumatic function and an electrical function and the second actuator function is selected from a group comprising a hydraulic function, a pneumatic function and an electrical function.

18. Agricultural implement according to claim 14, wherein the agricultural implement is a soil-working agricultural implement, such as a cultivator, a harrow, a plough, a sowing machine or a machine for distributing granulated or fluid material to the ground over which the agricultural implement is travelling.

19. Agricultural implement comprising:
a first actuator function,
a second actuator function,
a first user interface,
a second user interface,
a first speed sensor configured to detect an advancing speed of the agricultural implement, and
a control unit which is configured to receive a speed signal from the first speed sensor and which is configured to control the first and second actuator functions based on a control signal from the user interface,
a main regulator via which one of the first and the second actuator functions is supplied with power, which can be by-passed with the aid of the second user interface,
wherein the control unit is configured:
to allow, if the speed signal fulfils a predetermined criterion, the activation of a first actuator function and of a second actuator function based on the control signal, and
to restrict, if the speed signal does not fulfil the criterion, the possibility of activating the first actuator function based on the control signal by permitting activation of the first actuator function based on the control signal only if an input from the second user interface is provided so that the main regulator is by-passed.

20. Agricultural implement comprising:
a first actuator function,
a second actuator function,
a first user interface,
a control unit which is configured to receive an activation signal from the user interface and which is configured to control the first and second actuator functions,
a position sensor for determining the position of the first user interface,
a main regulator via which one of the first and the second actuator functions is supplied with power, which can be by-passed with the aid of the second user interface,
wherein the control unit is configured:
to allow, if the position is not in a safe area, the activation of a first actuator function and of a second actuator function based on the control signal, and
to restrict, if the position is not in the safe area, the possibility of activating the first actuator function based on the control signal,
wherein restricting the possibility of activating the first actuator function is achieved by permitting activation of the first actuator function based on the control signal only if an input from the second user interface is provided so that the main regulator is by-passed.

* * * * *